United States Patent [19]
Golder

[11] 3,839,267
[45] Oct. 1, 1974

[54] HETEROGENEOUS MELT HYDROLYSIS OF OXYMETHYLENE COPOLYMERS

[75] Inventor: Michael D. Golder, Bronx, N.Y.

[73] Assignee: Celanese Corporation, New York, N.Y.

[22] Filed: Apr. 12, 1973

[21] Appl. No.: 350,428

[52] U.S. Cl......... 260/37 AL, 260/30.2, 260/67 FD
[51] Int. Cl............................................. C08g 51/04
[58] Field of Search............ 260/37 AL, 30.2, 67 FP

[56] References Cited
UNITED STATES PATENTS

| | | | |
|---|---|---|---|
| 3,169,938 | 2/1965 | Evers et al...................... | 260/37 AL |
| 3,189,615 | 6/1965 | Heller................................ | 260/30.2 |
| 3,219,623 | 11/1965 | Berardinelli..................... | 260/37 AL |
| 3,318,848 | 5/1967 | Clark............................... | 260/67 FP |
| 3,450,665 | 6/1969 | Wagner et al.................. | 260/37 AL |
| 3,484,400 | 12/1969 | Halek............................ | 260/37 AL |

OTHER PUBLICATIONS
Encyclopedia of Polymer Science & Technology, Vol. 6, 1967, pp. 740–745.

Primary Examiner—Morris Liebman
Assistant Examiner—E. Suzanne Parr
Attorney, Agent, or Firm—Thomas J. Morgan

[57] ABSTRACT

An improved process for the stabilization of a normally solid oxymethylene copolymer whose molecules contain a majority of relatively unstable monomeric oxymethylene units interspersed with comparatively stable, monomeric higher oxyalkylene units, e.g., —O—CH$_2$—CH$_2$— units, at least part of the terminal portions of said molecule comprising said unstable monomeric units, wherein said copolymer is hydrolyzed in the presence of water, alcohol, trioxane or mixtures thereof is present as a vapor in which said improvement comprises hydrolyzing in the presence of a stabilizer system comprising an acid scavenger; an antioxidant; or an acid scavenger and an antioxidant.

13 Claims, No Drawings

HETEROGENEOUS MELT HYDROLYSIS OF OXYMETHYLENE COPOLYMERS

BACKGROUND OF THE INVENTION

1. Field of the Invention

This invention relates to an improved process for the stabilization of polyoxymethylenes against degradation.

Polyoxymethylenes are a group of thermoplastic resins excellently suited for the manufacture of shaped articles by the injection molding or extrusion processes for they possess very advantageous mechanical properties which result in shaped articles made therefrom characterized by their hardness, strength and toughness.

These resins are, however, subject to degradation, particularly under the influence of heat. The degradation results mainly from the following three processes:

1. Thermal degradation of the chain end with liberation of gaseous formaldehyde. This degradation which takes place largely under the influence of heat, is often obviated by the presence of either an ether or an ester group at the end of the polymer chain.

2. Oxidative attack leading to chain scission and depolymerization. This is often retarded by the addition of antioxidants to the composition such as compounds containing phenolic or amino groups.

3. Acidolytic cleavage of the chain may occur which also liberates formaldehyde. Acidolytic degradation arises from the presence of acidic species orginating from one of several sources: (A) acidic catalyst residues which may have been used in preparation of the polymer, (B) formic acid formed in situ when the trace quantities of formaldehyde generated in processing are oxidized, and (C) acetic acid generated from acetate end groups when a given chain, so stabilized, depolymerizes as a result of occasional oxidative or acidolytic chain scission. To alleviate this condition and to prevent degradation of the polyoxymethylene copolymer especially during subsequent processing in the hot state, "formaldehyde acceptors" or "acid scavengers" are often admixed with the polymer composition. Among the compounds which can be used for this purpose are hydrazines and their derivatives, ureas, certain amides and diamides, polyamides, and metallic salts of acetic acid and fatty acids.

2. Description of the Prior Art

Most polyoxymethylenes are heterogeneous polymers, i.e., the polymer contains both stable and unstable units. A common method of stabilizing such a polymer is to treat it in such a way as to selectively degrade the end portion of the molecules, which are made up of the comparatively susceptible monomeric units usually via a hydrolysis reaction thereby leaving a residual polymer having the comparatively stable monomeric units in terminal portions of its molecules.

Usually at least ninety percent of the polymeric chain of the molecules of the treated polymer have comparatively stable or comparatively thermal-resistant units in terminal positions; however, during subsequent hot processing inevitably there is a further release of formaldehyde and attendant acids, etc., which in turn tend to attack and degrade the polymer chains. Therefore, after the aforedescribed hydrolysis treatment, stabilizer system comprising an acid scavenger; an antioxidant; or an acid scavenger and an antioxidant is often extruder-blended to neutralize the effect of any liberated compounds. However, this stabilizer blending step is itself often accompanied by undesirable polymer breakdown due to the necessary hot-working of the polymer to percent by uniform admixing of the stabilizer system.

The addition of an acid acceptor before the hydrolysis treatment has heretofore been impossible due to the large volume of acids, etc. present during the hydrolysis reaction.

However, it has been discovered and is herein disclosed that if a heterogeneous melt hydrolysis reaction as taught in Ser. No. 247,625 which application is assigned to the same assignee as the instant invention and is herein incorporated by reference, is utilized to hydrolize the polyoxymethylene polymers, the presence of an acid scavenger; an antioxidant; or an acid scavenger and an antioxidant realizes (1) a wholly unexpected increase in thermal stability and, of course, (2) the elimination of a subsequent stabilizer addition process with its attendant polymer molecular weight reduction.

SUMMARY OF THE INVENTION

It is an object of the present invention to provide a process whereby a stabilized polyoxymethylene copolymer product is produced more rapidly and economically than that heretofore realizable in prior art — taught processes.

It is also an object of this invention to produce a stabilized polyoxymethylene copolymer with natural i.e., unpigmented Hunter Color "$b$" values of less than +7.

These objects are obtained by treating polyoxymethylene copolymers to a heterogeneous melt hydrolysis in the presence of an acid acceptor; an antioxidant; or an acid acceptor and an antioxidant.

DETAILED DESCRIPTION OF THE INVENTION

This invention relates to the discovery that when an acid scavenger; an antioxidant; or an acid scavenger and an antioxidant are present during the heterogeneous melt hydrolysis of a polyoxymethylene copolymer, as opposed to the prior art process of being blended with said copolymer subsequent to said hydrolysis, a more stable final product is realized.

In view of the quantity of formaldehyde and associated acids being produced during said hydrolysis, this result is indeed unexpected. Importantly the highly colored cyanoguanidine-formaldehyde polymer-like adduct which normally forms when the preferred acid scavenger cyanoguanidine is present in the formaldehyde-rich, hydrolysis environment does not form in a heterogeneous melt hydrolysis zone.

Although not wishing to be bound, it is believed that under the specific heterogeneous melt hydrolysis as described and used herein, in situ, steam-stripping is occuring wherein the formaldehyde and associated acids are being carried out of the melt into the vapor state immediately upon being produced thereby minimizing the contact i.e., available reaction time, with the liquid acid scavenger and/or antioxidant.

Additionally, the presence of the acid scavenger; antioxidant; or the scavenger plus antioxidant as the copolymer initially melts, i.e., just prior to the hydrolysis stabilization zone, retards the degradation that normally begins at this stage.

Oxymethylene polymers having recurring —OCH$_2$— units directly attached to each other, have been known for many years. They may be prepared by the polymerization of anhydrous formaldehyde or by the polymerization of trioxane, which is a cyclic trimer of formaldehyde. High molecular weight oxymethylene polymers vary in thermal stability and, in accordance with a preferred embodiment of this invention, the polymer; which is stabilized is an oxymethylene polymer containing carbon-to-carbon single bonds in the main polymer chain.

In a particularly preferred embodiment of the invention the polymeric compounds to be treated are oxymethylene copolymers having at least one chain containing recurring oxymethylene units interspersed with —OR— groups in the main polymer chain, where R is a divalent radical containing at least two carbon atoms directly linked to each other and positioned in the polymer chain between the two valences, with any substituents on said R radical being inert, that is, those which are free of interfering functional groups and will not induce undesirable reactions. Particularly preferred are copolymers which contain from 60 to 99.6 mol percent of recurring oxymethylene groups. In a preferred embodiment R may be, for example, an alkylene or substituted alkylene group containing at least two carbon atoms.

Among the copolymers which may be utilized in accordance with this aspect of the invention are those having a structure comprising recurring units having the formula

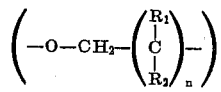

wherein $n$ is an integer from zero to 5 and wherein $n$ is zero in from 60 to 99.6 percent of the recurring units. $R_1$ and $R_2$ are inert substituents, that is, substituents which are free of interfering functional groups and will not induce undesirable reactions.

A preferred class of copolymers are those having a structure comprising oxymethylene and oxymethylene recurring units wherein from 60 to 99.6 percent of the recurring units are oxymethylene units.

Particularly preferred oxymethylene polymers are those having incorporated therein oxyalkylene units having adjacent carbon atoms which are derived from cyclic ethers having adjacent carbon atoms. These copolymers may be prepared by copolymerizing trioxane with a cyclic ether having the structure

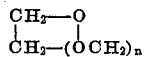

wherein $n$ is an integer from zero to 2.

Examples of preferred polymers include copolymers of trioxane and cyclic ethers containing at least two adjacent carbon atoms such as the copolymers disclosed in U.S. Pat. No. 3,027,352 by Cheves T. Walling, Frank Brown and Kenneth W. Bartz, which patent is assigned to the same assignee as the subject application.

Among the specific cyclic ethers which may be used are ethylene oxide; 1,3-dioxolane; 1,3,5-trioxepane; 1,3-dioxane; trimethylene oxide; pentamethylene oxide; 1,2-propylene oxide; 1,2-butylene oxide; neopentyl glycol formal; pentaerythrital diformal paraldehyde; tetrahydrofuran and butadiene monoxide.

As used in the specification and claims of this application, the term "copolymer" means polymers having two or more monomeric groups, including terpolymers and higher polymers. Suitable terpolymers include those disclosed in U.S. patent application Ser. No. 229,715, filed Oct. 10, 1962, by W. E. Heinz and F. B. McAndrew, which is assigned to the same assignee as the subject application.

In particular, the subject invention relates to a process for the hydrolysis-stabilization of a hydrocarbon solid oxymethylene copolymer having a melting point above 150°C., the molecules of said copolymer containing from 60 to 99.6 mol percent of comparatively unstable monomeric oxymethylene units interspersed with comparatively stable monomeric —O—R— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, said process comprising placing said polymer and between about 2 to about 25 weight percent of said polymer of a reactant selected from the groups consisting of water, alcohol, trioxane and mixtures thereof; and from between about 0.05 and 10.0 wt percent (based on the weight of polymer) of a stabilizer system comprising an acid scavenger or an acid scavenger and an antioxidant in a reactor, reacting the mixture by exposing said polymer; said stabilizer system and said reactant to a temperature above the melting point of said copolymer, preferably between the second presence about 160°C. and about 240°C. and a pressure sufficient to maintain said polymer in a liquid state and said reactant in a vaporous state preferably less than about 150 psia., for between about 0.01 and about 15 minutes, said temperature and time being sufficient to remove said stable monomeric units from the terminal portions of said molecules so that said molecules are terminated by said stable monomeric units and removing the unreacted reactant and other volatilizable material by reducing the pressure to a pressure between about 0.1 psia and about 50 psia so that said materials are volatilized: the time, temperature and pressure criteria being taught in Ser. No. 247,625, which application is assigned to the same assignee as the instant invention and is herein incorporated by reference.

The preferred polymers which are treated in this invention are thermoplastic materials having a melting point of at least 150°C. and are normally millable at a temperature of 200°C. These polymers have a high thermal stability before treatment in accordance with this invention but this stability is markedly improved by such treatment.

The preferred polymers which are treated in this invention have a melt index (M.I.) of less than 50, preferably less than 30 via ASTM D 1238-62T. After treatment, the preferred copolymers exhibit remarkable alkaline stability. For example if the treated copolymers are refluxed at a temperature of about 142°C. 145°C. in a 50 percent solution of sodium hydroxide in water for a period of 45 minutes, the weight of the copolymer will be reduced by much less than one percent.

The preferred catalysts used in the preparation of the desired copolymers are boron fluoride and boron fluoride coordinate complexes with organic compounds, particularly those in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are complexes with methyl acetate, with ethyl acetate, with phenyl acetate, with dimethyl ether, with methyl phenyl ether and with dimethyl sulfide. Suitable catalysts are disclosed in U.S. Pat. Nos. 2,989,505, 2,989,506, 2,989,507, 2,989,509, all of which are by Donald E. Hudgin and Frank M. Berardinelli; U.S. Pat. No. 2,989,510, by George J. Bruni; and U.S. Pat. No. 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commerical grade reactants or may be introduced by contact with atmospheric air, will not prevent polymerization, but should be removed for best yields.

In preparing the preferred copolymers, the trioxane, cyclic ether and catalyst are dissolved in a common anhydrous solvent such as cyclohexane, and permitted to react in a sealed reaction zone. The temperature in the reaction zone may vary from about 0°C. to about 120°C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3-dioxolane contains both an oxymethylene group and an oxyethylene group. Its incorporation into the copolymer molecule increases both the oxymethylene and the oxyethylene content of the polymeric molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.5:1.

Upon completion of the polymerization reaction it is desirable to neutralize the activity of the polymerization catalyst since prolonged contact with the catalyst degrades the polymer. The polymerization product may be treated with an aliphatic amine such as tri-n-butylamine or triethylamine, in stoichiometric excess over the amount of free catalyst in the reaction product, and preferably in an organic liquid which is a solvent for unreacted trioxane. Or, if desired, the reaction product may be washed with water which neutralizes catalyst activity. A detailed description of suitable methods of neutralizing catalyst activity may be found in U.S. Pat. No. 2,989,509 by Donald E. Hudgin and Frank M. Berardinelli, assigned to V/TA assignee as the subject application.

In accordance with the subject invention, the comparatively unstable monomeric portions of units of the polymer may be removed by a process which comprises treating the polymer in the presence of an acid scavenger; an antioxidant; or an acid scavenger and an antioxidant with a reactant under conditions at elevated temperature and pressure such that the system is a heterogeneous one, i.e., a two phase system; the polymer being in a molten state and the reactant being in a vaporous state; and continuing reaction for a period of time sufficient to remove comparatively unstable portions or units from the ends of the polymer molecules so that the molecules are terminated by comparatively stable units.

The polymer-stabilizer-reactant system may achieve this two phase form by a number of methods, such as (1) melting the polymer and adding the reactant and stabilizer(s) thereto under such conditions that the reactant remains in a vapor state, or (2) mixing the polymer; the stabilizer(s); and the reactant and then heating under pressure until the polymer-stabilizer-reactant system is in the molten liquid-vaporous state.

Where the copolymer is a heterogeneous copolymer with the comparatively unstable units being oxymethylene units, the preferred treatment is a "stabilization hydrolysis" treatment under alkaline conditions. In a preferred embodiment the polymer is reacted with from about 2 weight percent to about 25 weight percent of the preferred hydrolysis reactant in the presence of from about 0.05 to 10.0 wt. percent (based on the weight of the polymer) of an acid scavenger; an antioxidant; or an acid scavenger materials, an antioxidant. The reaction must take place at an elevated temperature and pressure such that the sprinkler polymer will be in a molten liquid condition and the reactant will be in a vaporous i.e., gaseous state. Thus, the treatment may be referred to as a "heterogeneous melt stabilization hydrolysis" as opposed to the homogeneous molten hydrolyses which are disclosed in U.S. Pat. No. 3,318,848 by Charles M. Clarke issued May 9, 1967 and U.S. Pat. No. 3,418,280 by Donald E. Orgen issued Dec. 24, 1968 both of which are assigned to the same assignee as the subject invention.

The hydrolytic reactant may be water, trioxane or a primary secondary or tertiary aliphatic or aromatic alcohol or mixtures thereof. Of primary consideration in the selection of said alcohol is that its thermodynamic properties are such that under the processing criteria of the instant invention, the alcohol and/or said alcohol-water mixtures are in the vaporous state. Suitable alcohols include aliphatic alcohols and preferably those methyl alcohol, ethyl alcohol, n-propyl alchol, isopropyl alcohol, etc.

As used herein the term "hydrolysis" includes the reaction of the water or the aforementioned hydroxy-containing materials or mixtures thereof.

The terminal units of the oxymethylene polymer are often hydroxy-substituted oxymethylene (—O—CH$_2$—OH)

In the following examples a 1¼ inch diameter extruder is used, the screw of which is so designed that at the point of the barrel where the blowing agents are introduced there is a region where the pressure is comparatively low compared with that upstream of the point.

Preferably, the stabilization-hydrolysis reaction takes place under alkaline vapor conditions such that the pH of the hydrolysis reactant, when added to the polymer, is above 9.0. To obtain such a pH, alkaline material must be present. The alkaline material is preferably water soluble, or soluble in the hydroxy-containing material, and may be a strongly basic hydroxide such as the hydroxide of an alkali metal or alkaline earth metal, or it may be the salt of a strong base and a weak acid, or it may be ammonia or an organic base such as amine or an amidine.

Among the specific alkaline materials which may be used are sodium hydroxide, potassium hydroxide, sodium carbonate, sodium acetate, ammonium hydroxide, triethylene amine tripropyl amine, tetramethyl guanadine, trimethylamine, triethylamine, tributylamine, melamine, calcium hydroxide etc. The amount of alkaline material present in the chemical reaction is from 0.001 weight percent of about 10.0 weight percent, preferably between about 0.001 weight percent and about 1.0 weight percent.

One advantage of the alkaline hydrolysis over neutral hydrolysis is that the alkaline hydrolysis is faster and the alkaline material will neutralize any excess polymerization catalyst present or any acidic material formed during the reaction which might otherwise tend to "Rubber World," polymer during the hydrolysis step tie-up specific acid acceptors of the instant invention.

In certain instances it is desirable to obtain the desired pH by extruded an alkaline material, such as triethylamine, in an amount sufficient that triethylamine will maintain basic conditions throughout the course of the hydrolysis reaction and will react with any acidic materials formed.

In suitable embodiments an amount of 0.7 weight percent triethylamine, based on weight of the polymer, would be sufficient. Therefore, if 5 percent hydrolysis reactant was added to the polymer the hydrolyzed solution could contain 5.0 weight percent triethylamine and the pH of the hydrolysis solution would be adjusted before addition to the polymer. In some instances it may be that some water is contained in the polymer in addition to that added in the hydrolysis solution.

After the polymerization reaction it may be desirable to subject the polymer to washing and drying in order to neutralize the active catalyst and remove unreacted monomers, solvent and catalyst residues. Specifically, water or a mixture of an alcohol, such as methanol and water, may be used in which small amounts of amonia or an amine such as triethylamine may be present.

On some occasions, it may be desirable to neutralize the catalyst and then filter, wash and dry the polymer. The polymer may then be conveniently kept until it is subjected to the stabilization-hydrolysis treatment at a later time.

Among the acid scavengers contemplated for use in the instant invention are the hydrazines and their derivatives; ureas; amides, amidines, and polyamides; the metallic salts of fatty acids. Specifically, preferred acid scavengers which inch are dicyanodiamide (cyanoguanidine); magnesium acetate; calcium hydroxy steorate; calcium ricinoleate; and calcium lactate. extrusion In addition to or in lieu of the scavengers of the instant invention it is also contemplated to incorporate one or more other chemical stabilizers into the copolymer in order to bring its thermal degradation rate even lower. The proportion of stabilizer incorporated depends upon the specific stabilizer used. A proportion between about 0.5 and 10 weight percent (based on the weight of polymer) has been found to be suitable for most stabilizers.

One suitable stabilizer is an anti-oxidant ingredient, such as phenolic anti-oxidant, and most suitably a substituted bisphenol.

A suitable class of substituted bisphenols are the alkylene bisphenols including compounds having from one to four carbon atoms in the alkylene group and having from zero to 2 alkyl substituents on each benzene ring, each alkyl substituent having from one to four carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Especially suitable as antioxidants are the hindered phenols which are ester derivatives of 3,5 di-t-butyl-4-hydroxy phenyl propionic acid, e.g., tetrakis [methylene-3-(3',5'-di-t-butyl-4', hydroxy phenyl) propionate] methane; ethyl-1,1,1-tris-[-methylene-3-(3', 5',-di-t-butyl-4'-hydroxy phenyl) propionate]; and hexane -1,6-bis [3-(3'-di-t-butyl-4'-hydroxy phenyl) propionate].

After the heterogeneous melt stabilization-hydrolysis reaction has been completed and a satisfactory amount of unstable monomeric units have been removed from the polymer molecules, the remaining chemical reactant is removed from the treated polymer. Also the degradation or reaction products and, on occasion, unreacted materials, such as trioxane, should also be removed. Formaldehyde is the principal hydrolysis degradation product of oxymethylene polymers and it is believed to be formed by the successive detachment of the terminal oxymethylene units from the end of the polymer chain. In some instances, particularly when the polymerization reaction product is promptly hydrolyzed, the hydrolyzed material may include some unreacted trioxane. In accordance with a preferred embodiment of this invention the chemical reactant, the formaldehyde, the trioxane and other volatizable materials may be removed by suddenly reducing the pressure under which the materials have been maintained, which in view of the temperature, results in the volatilization of the volatile materials. The lower pressure should be between about 0.1 p.s.i.a. and 50 p.s.i.a. and is preferably accomplished by exposing the materials to atmospheric pressure or a slight vacuum (about 0.5 p.s.i.a.)

In a preferred embodiment of this invention the time during which the molten polymer and stabilizer system are subjected to elevated temperatures and pressures in the presence of a vaporous reactant (this time is known as residence time) falls between about 0.1 and about 15 minutes. The temperature range is preferably between about 160°C. and about 240°C. second inch The pressure range is that necessary to maintain the two phase reaction i.e. the polymer in a molten state and the reactants in a vaporous condition; preferably below about 150 p.s.i.a.

The residence time, temperature and pressure are interrelated and are preferably maintained so that the polymer-stabilizer- reactant system remains in the aforedescribed state and the reaction proceeds sufficiently so that the desired amount of unstable units are removed from the ends of the polymer molecules so that they are terminated by comparatively stable units.

The following examples use a trioxane-ethylene oxide copolymer containing about 2 weight percent of oxyethylene groups distributed in the oxymethylene chains. Also, the reaction product from the polymerization reactor was washed with water and dried to neutralize and remove the catalyst and to remove unreacted trioxane.

$K_d$ refers to the percent polymer weight loss per minute determined by heating the polymer in an open vessel in a circulating to a oven at a cylinder which of 230°C.

EXAMPLES 1–6

Examples 1–6 are illustrative of the results obtained when a homogeneous hydrolysis reaction via a single screw extruder is conducted both in the presence and absence of the acid scavenger and antioxidant stabilizer system of the instant invention. In the examples were the stabilizer(s) are not present during the hydrolysis, it is blended with the polymer and re-extruded before testing.

The polymer or polymer and stabilizers is force fed to a one inch single screw extruder having a length to diameter ratio of 20/1. The feed section of the extruder had five turns and a channel depth of 185 mils. Thus the polymer is fed under pressure to the metering or melt hydrolysis section which has 6 turns with a channel depth of 60 mils. The reactant is pumped into the extruder at the beginning of the melt hydrolysis section. Next there is a restricted section of one and one-half turns with a channel depth of 22 mils. This restricted section maintains pressures in the melt hydrolysis section. The polymer-reactant system or polymer-stabilizer-reactant system then passes to a vented section (which may be referred to as low pressure section) having four turns with a channel depth of 220 mils. When the heated pressurized system passes to the vented section the pressure is suddenly reduced and the formaldehyde, reactant, and other vaporizable components are removed through the vent. The treated polymer then passes through a pumping (or pre-extrusion) section having 3 ½ turns with a channel depth of 60 mils, where the polymer is densified. The polymer is subsequently extruded through a die. If the chemical stabilizers are not present, they are then blended with a polymer and re-extruded. This will be labeled a "double pass" as opposed to the "single pass" process wherein the stabilizer(s) are present during the hydrolysis.

The operating parameters and resulting data are tabulated in Table I. adjusted

TABLE I

Hydrolysis Temp Range: 160–240°C
Hydrolysis Pressure: Above 750 psi

| Example | No. of Passes | Composition | $K_{d230}$ |
|---|---|---|---|
| 1 | Single | CAR'(0.10)[2] Anti Ox (0.50)[3] Acrawax C (0.03)[4] | 0.016 |
| 2 | Double | CAR (0.10) Anti Ox (0.50) ACRAWAXC (0.03) | 0.012 |
| 3 | Single | CNG[5] (0.10) Anti Ox (0.50) Melamine (0.03) Acrawax C (0.03) | 0.030 |
| 4 | Single | CNG (0.10) Melamine (0.03) Acrawax C (0.03) Ant. Ox[6] (0.50) | 0.040 |
| 5 | Double | CNG (0.10) Anti Ox (0.50) Melamine (0.03) Acrawax C (0.03) | 0.025 |
| 6 | Double | CNG (0.10) Anti Ox (0.50) Melamine (0.03) Acrawax C (0.03) | 0.028 |

1. CAR: Calcium Ricinoleate
2. (0.10): weight percent based on total polymer weight
3. Anti Ox: 2,2'-methylene bis(4-methyl-6-t-butyl phenol)
4. Acrawax C: ethylene bis stearamide
5. CNG: Cyanoguanidine
6. Blended in a second extrusion As can be seen in the above table, when the stabilizers of the instant invention are present during a homogeneous melt hydrolysis as opposed to being blended with the copolymer subsequent to said hydrolysis, there is a significant decrease in stability; viz an increased in $K_d$. Also to be noted is that in the homogeneous melt hydrolysis runs with the stabilizers present, there occurs severe and totally unacceptable discoloration i.e., dark yellow to brown, of the copolymer product believed to be caused by quinoidal ring formation in the CAR case and CNG-formaldehyde reactions in the other. The yellowness of the discolored products usually exceed Hunter Color "b" values of +15. Additionally, when stabilizer(s) are present during the homogeneous hydrolysis melt reaction, a significant reduction in short term stability is realized as exemplified by 5 ½ hour percent weight loss data at 230°F. For the double pass runs such as Examples 5 and 6, it is of the order of 9.5 percent where as in the single pass runs such as is illustrated in Example 1, it is of the order of 82 percent.

EXAMPLES 7–12

The following examples are realized through the use of a co-rotating, intermeshed twin-screw extruder.

The machine has a total L/D ratio of 43 and is composed of feeding and melting sections with an L/D of 12.5; a hydrolysis section and solvent injection port with an L/D of 20.5 and devolatization and die pumping sections with an L/D of 10. A melt seal is formed at the beginning and end of the heterogeneous melt hydrolysis zone by use of left handed screw bushings. Otherwise, the entire screw consists of right handed screw bushings; i.e., no kneading blocks are utilized. As in Examples 1–6, if the chemical stabilizers are not present in the reaction zone they are blended with the hydrolyzed polymer and the blend re-extruded. The operating parameters and the resulting data are tabulated in Table II.

TABLE III

| Example | Hydrolysis | Stabilizer Added during Hydrolysis | Stabilizer(s) Added during Subsequent Step | $K_{d230}$ |
|---|---|---|---|---|
| 13 (Ex.2) | Homogeneous | none | CAR, Anti Ox, Acrawax C | 0.012 |
| 14 | Homogeneous | CAR | Anti Ox, Acrawax C | 0.016 |
| 15 | Heterogeneous | CAR | Anti Ox, Acrawax C | 0.010 |
| 16 (Ex.6) | Homogeneous | none | CNG, Anti Ox Acrawax C, Melamine | 0.028 |
| 17 | Homogeneous | CNG | Anti Ox, Acrawax C, Melamine | 0.039 |
| 18 | Heterogeneous | CNG | Anti Ox, Acrawax C, Melamine | 0.014 |
| 19 (Ex.5) | Homogeneous | none | CNG, Anti Ox, Acrawax C, Melamine | 0.025 |
| 20 | Homogeneous | Anti Ox | CNG, Acrawax C, Melamine | 0.028 |
| 21 | Heterogeneous | Anti Ox | CNG, Acrawax C, Melamine | 0.013 |

TABLE II

Hydrolysis Temp. Range: 160–240°C
Hydrolysis Pressure: below 150 psi

| Example | No. of Passes | Composition | $K_{d230}$ | M.I. |
|---|---|---|---|---|
| 7 | Single | CAR(0.1) Anti Ox (0.50) Acrawax C (0.03) | 0.010 | 9.0 |
| 8 | Double | CAR (0.1) Anti ox (0.50) Acrawax C (0.03) | 0.013 | 9.9 |
| 9 | Single | CNG (0.1) Anti Ox (0.50) Melamine (0.03) Acrawax C (0.03) | 0.011 | 9.5 |
| 10 | Double | CNG (0.1) Anti ox (0.50) Melamine (0.03) Acrawax C (0.03) | 0.014 | 10.5 |
| 11 | Single | CNG (0.1) Antiox (0.50) Melamine (0.03) Acrawax C (0.03) | 0.013 | 9.3 |
| 12 | Double | CNG (0.1) Antiox (0.50) Melamine (0.03) Acrawax C (0.03) | 0.015 | 10.0 |

At the outset, Examples 7–12 generally illustrate the decidedly improved stability of the copolymer, as seen by the lower $K_{d230}$ values, when a heterogeneous, i.e., two phase melt hydrolysis is utilized as opposed to the homogeneous melt hydrolysis as illustrated in Table I.

Specifically, attention is directed to the significant improvements realized in every case where the stabilizer is present during the hydrolysis reaction as opposed to merely a later addition. Also, the melt indices of the finished copolymers are noticeably higher with a stabilization-hydrolysis reaction.

Of special importance is that the normally severe discoloration that occurs when the stabilizers of the instant invention are present during polyoxymethylene hydrolysis reactions, does not occur when they are present during the heterogeneous melt hydrolysis of the instant invention as exemplified by Examples 7, 9 and 10 which realizes final copolymer color of from light ivory to white in color and whose Hunter Color "$b$" values never exceed +7.

EXAMPLES 13–21

The following examples compare stability results achieved when the polymer is subjected to a homogeneous hydrolysis and subsequently blended with an acid scavenger and an antioxidant system with that achieved when the polymer is 1) subjected to both a homogeneous and heterogeneous hydrolysis in the presence of an acid scavenger alone (the antioxidant being blended in a subsequent step) and 2) subjected to both a homogeneous and heterogeneous hydrolysis in the presence of an antioxidant alone (the acid scavenger being blended in a subsequent step).

The above table shows that when the acid scavenger or the antioxidant alone is added to a homogeneous hydrolysis reaction, the stability of the resulting polymer composition even when the balance of the stabilizer system is subsequently blended-in, in much poorer than that realized with the best prior art recognized technique of homogeneous hydrolysis followed by a subsequent extrusion/blending of a stabilizer system; i.e., examples number 13 vs. 14; 16 vs. 17; and 19 vs. 20.

Surprisingly, by merely changing the reaction zone conditions from the prior art homogeneous system to the heterogeneous melt hydrolysis process as taught in copending Serial No. 247,625 and the instant invention, stability values, i.e., $K_d$'s of the finished copolymers (nos. 15, 18 and 21) are not only improved but exceed those realized with the preferred prior art homogeneous reaction process, i.e., the hydrolysis followed by a stabilizer blending operation.

In addition, the color of the final copolymer is comparable to that achieved with the dual stabilizer reaction zones of the instant invention.

Included within the scope of this invention is the addition before; within; and after the hydrolysis zone various additives well known to those skilled in the art. These additives include but are not limited to pigments; fillers and reinforcing agents such as glass fiber; calcium silicate; asbestos; etc.; flow modifiers and lubricants such as ethylene bis stearamide; U.V. stabilizers such as the substituted benzotriazoles as taught in U.S. Pat. Nos. 3,004,896 and 3,189,615, etc.

It is to be understood that the foregoing detailed description is given merely by way of illustration and that many variations may be made therein without departing from the spirit of the invention.

The embodiments of the invention in which an exclusive property or privilege is claimed are defined as follows.

What I claim is:

1. In an extruder process for the stabilization of a normally solid oxymethylene copolymer having a melting point above about 150°C., the molecules of said copolymer containing from 60 to 99.6 mole percent of comparatively unstable monomeric oxymethylene units interspersed with comparatively stable monomeric—OR— units wherein R is a divalent radical containing at least two carbon atoms directly linked to each other and positioned in the polymer chain between the two valences, with any substituents on said R radical being inert, at least part of the terminal portions of said molecules comprising said unstable monomeric units, wherein the improvement comprises reacting in an extruder said copolymer; from 2 to about 25 weight percent, based on the copolymer of a reactant selected from the class consisting of water, and alcohol, and mixtures thereof and from about 0.05 to about 10.0 weight percent based on polymer weight of a stabilizer system selected from the group consisting of an acid scavenger, an antioxidant and an acid scavenger and an antioxidant in a heterogeneous reaction zone comprising molten copolymer and vaporous reactant by maintaining the reaction zone at a temperature above the melting point of copolymer and at a pressure sufficient to maintain the copolymer in a molten state and the reactant in a vapor state, and said system is reacted under the above conditions of temperature and pressure for a period of time in the range of from about 0.1 to about 15 minutes to remove unstable monomeric oxymethylene units from the terminal portions of the copolymer molecules so that at least 90 percent of the resulting polymeric chains of the molecules are terminated by the stable monomeric units.

2. The process of claim 1 wherein the temperature is in the range of from about 160° to 240°C.

3. The process of claim 1 wherein the pressure is below about 150 p.s.i.a.

4. The process of claim 1 wherein said stable units are oxymethylene units.

5. The process of claim 1 wherein any unreacted reactant is removed from the resulting stabilized copolymer by reducing the pressure in said reaction zone to a pressure in the range of from about 0.1 to about 50 p.s.i.a. to volatilize the unreacted reactant.

6. The process of claim 1 wherein the alcohol is selected from the class consisting of methyl alcohol, ethyl alcohol, n-propyl alcohol and isopropyl alcohol.

7. The process of claim 1 wherein the copolymer is reacted with the reactant under alkaline conditions.

8. The process of claim 1 wherein a reinforcing agent is present in the hydrolysis reaction zone.

9. The process of claim 8 wherein the reinforcing agent is fiberglass.

10. The process of claim 8 wherein the reinforcing agent is acicular calcium metasilicate.

11. The process of claim 8 wherein the reinforcing agent is fiberglass and calcium metasilicate.

12. The process of claim 8 wherein the reinforcing agent is fiberglass and asbestos.

13. The process of claim 1 wherein a substituted benzotriazole is present in the hydrolysis reaction zone.

* * * * *